UNITED STATES PATENT OFFICE 2,684,970

PRODUCTION OF FATS

Karl Heinz Imhausen and Paul Krieghoff, Witten (Ruhr), Germany, assignors to Imhausen & Co. G. m. b. H., Witten, Germany, a German body corporate, and Karl Heinz Imhausen, Witten, Germany No Drawing. Application February 16, 1951, Serial No. 211,432

11 Claims. (Cl. 260—409)

This invention is for improvements in or relating to the production of fats and has for its object to provide a process for producing hard and brittle fats of relatively low melting point.

Fats of the foregoing characteristics are required for a variety of purposes in e. g. the pharmaceutical and food industries. With the exception of cocoa butter, none of the known natural fats possess these characteristics while the so-called modified fats or synthetic fats similarly fall short of required standards. It is well known to effect hardening of fats by catalytic hydrogenation but the hydrogenated products, e. g. hydrogenated cocoa fat or palm kernal fat, have an increased melting point of about 35° C. but do not possess the desired hardness and brittleness.

It has now been unexpectedly discovered that fats having the desired characteristics hereinbefore referred to can be obtained by subjecting a free fatty acid derived from a natural fat or oil to hydrogenation and to esterification with a polyhydric alcohol, these steps being effected in either order. The free fatty acid is preferably employed in the form of a vegetable fat or oil which melts in the region of that desired in the final product and which has been split by lipolysis. Surprisingly, the products obtained by the direct hydrogenation of the initial fat or oil are not the same as, indeed, are markedly softer and less brittle than the products obtained by the process of the present invention.

In carrying the present invention into effect, it is not necessary to employ in either or both of the steps of hydrogenation and esterification the whole mixture of fatty acids obtained by the lipolysis of a fat or oil.

For many purposes, it may be advantageous to remove one or more fatty acid fractions before or after hydrogenation and to esterify only the remaining proportions. Thus the properties of the end product can be modified at will. Sometimes it may be advisable to remove by distillation the lowest boiling fatty acids, for instance after hydrogenation and before re-esterification. The fats thus obtained do not show oily excretions even under unfavourable conditions and have a greater stability.

One practical form of the invention consists in splitting a natural fat or oil by lipolysis, hydrogenating the mixture of free fatty acids thus obtained or a fraction thereof and re-esterifying by reaction with a polyhydric alcohol, such as glycerol.

Another form of the invention consists in first hydrogenating a natural fat or oil or the product of esterifying with a polyhydric alcohol a mixture of fatty acids obtained from a natural fat or oils, splitting the hydrogenated product by lipolysis and re-esterifying the product with glycerol or other polyhydric alcohol with, if desired, removal of one or more free fatty acid fractions before esterification.

Either of the aforesaid forms of the invention results in products which are considerably harder and more brittle than the original fat in either its original or hydrogenated state. Instead of natural fats (fatty acid glycerides) the technical fatty acid mixture normally obtained from them, may be used.

In view of the fact that the mono- and di-glycerides of fatty acids show in some respects similar and in other respects additional desired properties in comparison with the tri-glycerides, the re-esterification may be effected either with the necessary amount of glycerol to form tri-glyceride or with an excess. While glycerol is in many ways a preferred component for re-esterification, it may be replaced, especially for technical purposes, by other polyhydric alcohols.

The invention is illustrated but not limited by the following examples.

Example I 246 kg. of refined fatty acid of cocoa fat or palm kernel fat (iodine-number 22.4) are completely split up and the fatty acids are steam distilled at 3 mm. Hg. The distillate is hydrogenated at 180° C. and a hydrogen pressure of ca. 5 atm. using nickel as catalyst until the iodine-number has dropped to 0.8–3. 214 kg. of the hydrogenated fatty acid mixture which may be purified in usual manner are then esterified with 27.5 kg. of glycerol (98%), i. e. the theoretical amount, at 200° C. and 3 mm. Hg in the presence of a catalyst e. g. zinc dust. The esterified product having an acid number of 1.7 is then freed from catalyst, refined with alkali, treated with decolorising charcoal and/or bleaching earth and deodorised, for instance with steam.

The fat thus obtained is snow-white, hard and brittle, shows a conchoidal surface of fracture and has a melting point of 35.4° C.

Example II 321 kg. of refined vegetable oil fatty acid (iodine-number 17.8) are completely split up and distilled at 3 mm. Hg, the first runnings up to 172° C. and amounting to about 8% being removed, whereafter the remaining fatty acids are steam distilled. The fatty acid mixture is then hydrogenated at 180° C. and a hydrogen pressure of 5 atm. using a nickel catalyst. 258 kg. of the fatty acid freed from catalyst and preferably refined, are esterified with 33 kg. of glycerol (97.2%) at 200° C. and 3 mm. Hg in the presence of a catalyst. The esterification product having an acid-number of 1.4, is freed from the catalyst, refined with alkali, treated with decolorising carbon and/or bleaching earth and deodorised.

The fat thus obtained is snow-white, hard and brittle and shows a conchoidal surface of fracture and has a melting point of 35.7° C.

*Example III*

308 kg. of refined vegetable oil fatty acid (saponification number 242) are completely split up and fractionated in such manner that the acid-number of the distillate to be used is 232. 265 kg. of the distillate are esterified with 35 kg. of glycerol at 200° C. and 3 mm. Hg vacuum in the presence of zinc dust as catalyst whereby the triglyceride is formed. If the acid-number of the reaction product drops below 3, the esterification catalyst is removed and the fat hardened by hydrogenation at 180° C. until the melting point is about 35° C. The fat is then filtered, refined in usual manner, deodorised and drawn off after cooling down to 60–70° C.

*Example IV*

362 kg. of vegetable fat having a melting point of 26° C. are catalytically hydrogenated in known manner until the melting point is about 34.5° C. After removal of the catalyst the hydrogenated product is split up as completely as possible by lipolysis and the resultant fatty acid subjected to steam-distillation, if desired under fractionation. 272 kg. of the distilled hard fatty acid having an acid-number of 237 are esterified with 36.7 kg. glycerol (96%) at 200–210° C. and 3 mm. Hg in the presence of an esterification catalyst whereby the tri-glyceride is formed. After removal of the catalyst the fat is refined and deodorised in the usual manner and drawn off into containers after cooling down to about 60° C.

The product is considerably harder and more brittle than the original fat even after hydrogenation and has a melting point of 36.3° C.

We claim:

1. A process for producing a hard and brittle fat of relatively low melting point which comprises subjecting a mixture of free fatty acids derived from a member of the class consisting of natural oils and fats to substantially complete hydrogenation and to esterification with a polyhydric alcohol, these steps being carried out in either order.

2. A process for producing a hard and brittle fat of relatively low melting point which comprises subjecting vegetable fat to splitting by lipolysis, substantially complete hydrogenation and to esterification with a polyhydric alcohol, these steps being effected in any order save in that lipolysis precedes esterification.

3. A process for producing a hard and brittle fat of relatively low melting point which comprises subjecting glyceride oil to splitting by lipolysis, substantially complete hydrogenation and to esterification with a polyhydric alcohol, these steps being effected in any order save in that lipolysis precedes esterification.

4. A process for producing a hard and brittle fat of relatively low melting point which comprises subjecting vegetable fat to splitting by lipolysis, substantially complete hydrogenation and to esterification with glycerol, these steps being effected in any order save in that lipolysis precedes esterification.

5. A process for producing a hard and brittle fat of relatively low melting point which comprises subjecting glyceride oil to splitting by lipolysis, substantially complete hydrogenation and to esterification with glycerol, these steps being effected in any order save in that lipolysis precedes esterification.

6. A process for producing a hard and brittle fat of relatively low melting point in which a vegetable fat is split up by lipolysis, one or more free fatty acid fractions are removed, the remaining free fatty acid mixture is re-esterified with glycerol and the product is catalytically substantially completely hydrogenated.

7. A process for producing a hard and brittle fat of relatively low melting point in which a vegetable fat is catalytically substantially completely hydrogenated, the product is split up by lipolysis and after removal of one or more fractions, thereafter re-esterified with glycerol.

8. A process as claimed in claim 6 wherein the quantity of glycerol employed is in excess of that required to form triglyceride.

9. A process as claimed in claim 7 wherein the quantity of glycerol employed is in excess of that required to form triglyceride.

10. A process for producing a hard and brittle fat of relatively low melting point in which a vegetable fat is split up by lipolysis, one or more low boiling free fatty acid fractions are removed, the remaining free fatty acid mixture is re-esterified with glycerol and the product is catalytically substantially completely hydrogenated.

11. A process for producing a hard and brittle fat of relatively low melting point in which a vegetable fat is catalytically substantially completely hydrogenated, the product is split up by lipolysis and after removal of one or more low boiling fractions, thereafter re-esterified with glycerol.

References Cited in the file of this patent

UNITED STATES PATENTS

| Number | Name | Date |
|---|---|---|
| 2,182,332 | Barsky | Dec. 5, 1939 |
| 2,197,339 | Gooding | Apr. 16, 1940 |
| 2,457,611 | Swern et al. | Dec. 28, 1948 |